United States Patent
Lehman et al.

(10) Patent No.: US 11,266,266 B2
(45) Date of Patent: Mar. 8, 2022

(54) FOOD PRODUCT ADAPTER FOR VERTICAL GRILL

(71) Applicant: Manitowoc FSG Operations, LLC, New Port Richey, FL (US)

(72) Inventors: Lon Lehman, Ft. Wayne, IN (US); Eugene Tippmann, Jr., Ft. Wayne, IN (US)

(73) Assignee: MANITOWOC FSG OPERATIONS, LLC, New Port Richey, FL (US)

( * ) Notice: Subject to any disclaimer, the term of this patent is extended or adjusted under 35 U.S.C. 154(b) by 191 days.

(21) Appl. No.: 16/001,865

(22) Filed: Jun. 6, 2018

(65) Prior Publication Data
US 2019/0133372 A1    May 9, 2019

Related U.S. Application Data

(60) Provisional application No. 62/515,912, filed on Jun. 6, 2017.

(51) Int. Cl.
*A47J 37/06* (2006.01)
*A47J 37/08* (2006.01)

(52) U.S. Cl.
CPC ....... *A47J 37/0611* (2013.01); *A47J 37/0688* (2013.01); *A47J 37/08* (2013.01)

(58) Field of Classification Search
CPC .......................... A47J 37/0688; A47J 37/0611; A47J 37/0885; A47J 37/0892; A47J 37/08
USPC ................. 99/391, 373, 390, 448, 394, 392; 219/392
See application file for complete search history.

(56) References Cited

U.S. PATENT DOCUMENTS

| | | | |
|---|---|---|---|
| 1,121,470 A | | 12/1914 | Bushnell |
| 1,687,712 A | * | 10/1928 | Chandler ................ A47J 37/08 99/390 |
| 1,814,942 A | | 7/1931 | Mabey |
| 1,893,989 A | * | 1/1933 | Galer .................. A47J 37/0688 99/338 |
| 1,903,324 A | * | 4/1933 | Codling .............. A47J 37/0688 99/392 |
| 2,027,002 A | * | 1/1936 | Sprang ...................... F24C 7/00 99/385 |
| 2,094,862 A | | 10/1937 | Welch |
| 2,329,937 A | * | 9/1943 | Orkfritz .............. A47J 37/0688 99/335 |
| 2,483,669 A | * | 10/1949 | Reid .................. A47J 37/0892 219/478 |
| 2,491,829 A | * | 12/1949 | Palmer .................... A47J 37/08 99/391 |

(Continued)

FOREIGN PATENT DOCUMENTS

EP    2456339 B1 *    1/2014    ......... A47J 37/0688

*Primary Examiner* — Jacob J Cigna
*Assistant Examiner* — Michael W Hotchkiss
(74) *Attorney, Agent, or Firm* — Ohlandt, Greeley, Ruggiero and Perle, LLP

(57) ABSTRACT

The disclosure provides a food product adapter for a vertical grill. The vertical grill is standardly configured to heat or cook a round, square, or rectangular patty approximately the size of a hamburger. The food product adapter enables heating or cooking of other shapes in a standard hamburger slot, such as sticks, tubes, rolls, and other food product having a relatively narrow width and a relatively long length, such as a hot dog, fish stick, or the like.

12 Claims, 13 Drawing Sheets

(56) References Cited

U.S. PATENT DOCUMENTS

| | | | | |
|---|---|---|---|---|
| 2,497,205 A * | 2/1950 | Brewton | A47J 37/0688 | 99/391 |
| 2,552,135 A | 5/1951 | Bertino | | |
| 2,941,463 A * | 6/1960 | Di Cuia | A47J 37/0688 | 99/393 |
| 2,962,957 A * | 12/1960 | Bork | A47J 37/0885 | 99/402 |
| 3,056,344 A * | 10/1962 | Miller | A47J 37/0688 | 99/390 |
| 3,421,432 A * | 1/1969 | Giepen | A47J 37/04 | 99/332 |
| 3,426,671 A * | 2/1969 | Sato | A47J 37/08 | 99/329 R |
| 3,511,170 A * | 5/1970 | O'Connor | A47J 37/0885 | 99/402 |
| 3,853,112 A | 12/1974 | Lazaridis et al. | | |
| 3,948,244 A | 4/1976 | Lazaridis et al. | | |
| 3,968,787 A | 7/1976 | Basiulis | | |
| 4,184,419 A * | 1/1980 | Ponte | A47J 37/0688 | 99/339 |
| 4,224,864 A | 9/1980 | Wendell | | |
| 4,245,147 A | 1/1981 | Cummings et al. | | |
| 4,290,349 A * | 9/1981 | Fiorenza | A47J 37/0694 | 16/361 |
| 4,346,651 A * | 8/1982 | Schickedanz | A47J 37/085 | 219/411 |
| 4,421,015 A | 12/1983 | Masters | | |
| 4,604,949 A | 8/1986 | Giese | | |
| 4,647,758 A * | 3/1987 | Kelian | A47J 37/0688 | 219/385 |
| 4,656,927 A * | 4/1987 | Mosby | A47J 37/0892 | 99/339 |
| 4,817,513 A * | 4/1989 | Carbon | A21B 5/026 | 99/372 |
| 4,901,631 A * | 2/1990 | Russell | A47J 37/0688 | 219/521 |
| 4,955,361 A | 9/1990 | Sotani et al. | | |
| 4,970,949 A | 11/1990 | Ferrara, Jr. et al. | | |
| 4,972,767 A * | 11/1990 | Russell | A47J 37/0688 | 99/339 |
| 5,156,637 A * | 10/1992 | Wai-Ching | A47J 37/0892 | 99/388 |
| 5,201,364 A | 4/1993 | Tippmann et al. | | |
| 5,203,258 A | 4/1993 | Tippmann et al. | | |
| 5,522,310 A | 6/1996 | Black | | |
| 5,549,040 A | 8/1996 | Naramura | | |
| 5,552,172 A | 9/1996 | Liebermann | | |
| 5,584,231 A * | 12/1996 | DeLeon | A47J 37/0611 | 219/492 |
| 5,639,498 A | 6/1997 | Bakosch | | |
| 5,655,434 A | 8/1997 | Liebermann | | |
| 5,716,657 A * | 2/1998 | Liebermann | A23L 3/10 | 426/232 |
| 5,735,191 A * | 4/1998 | Russell | A47J 37/0688 | 99/329 R |
| 5,862,747 A | 1/1999 | Handel | | |
| 5,970,851 A * | 10/1999 | Masel | A47J 37/0611 | 219/386 |
| 5,980,966 A | 11/1999 | Handel | | |
| 5,990,452 A | 11/1999 | Shelton | | |
| 6,109,169 A * | 8/2000 | Masel | A47J 37/0611 | 219/386 |
| 6,112,648 A * | 9/2000 | Origane | A47J 37/0892 | 99/385 |
| 6,145,431 A | 11/2000 | Tippmann et al. | | |
| 6,498,329 B1 | 12/2002 | Gibernau | | |
| 6,539,839 B1 | 4/2003 | Tippmann | | |
| 6,546,844 B1 * | 4/2003 | Trevino | A47J 37/0807 | 99/327 |
| 6,559,423 B2 * | 5/2003 | Nguyen | A47J 37/0814 | 219/386 |
| 6,675,700 B2 * | 1/2004 | Hong | A47J 37/0857 | 219/492 |
| 6,708,602 B2 * | 3/2004 | Nguyen | A47J 37/08 | 99/329 P |
| 7,047,871 B1 * | 5/2006 | Christoffel | A47J 37/0871 | 99/327 |
| 7,217,906 B2 | 5/2007 | Veltrop | | |
| 7,290,482 B2 * | 11/2007 | Pan | A47J 37/0892 | 219/521 |
| 7,335,860 B2 * | 2/2008 | Li | A47J 37/0611 | 219/450.1 |
| 7,530,473 B2 | 5/2009 | Chirnomas | | |
| 8,240,246 B2 * | 8/2012 | Davis | A47J 37/0885 | 99/392 |
| 8,291,813 B2 * | 10/2012 | Leaman | A47J 37/0814 | 99/393 |
| 8,367,977 B2 * | 2/2013 | Lehman | A47J 27/04 | 219/386 |
| 8,372,459 B2 * | 2/2013 | Owensby | A23L 5/10 | 426/231 |
| 8,822,886 B2 * | 9/2014 | Lehman | A47J 37/0611 | 219/386 |
| 9,867,501 B2 * | 1/2018 | Lehman | A47J 39/006 | |
| 2006/0137541 A1 | 6/2006 | Lippmann et al. | | |
| 2006/0180033 A1 * | 8/2006 | Pan | A47J 37/0892 | 99/388 |
| 2006/0180034 A1 * | 8/2006 | Arend | A47J 37/0892 | 99/389 |
| 2006/0261056 A1 * | 11/2006 | Veltrop | A47J 37/08 | 219/521 |
| 2011/0305810 A1 * | 12/2011 | Owensby | A47J 37/0611 | 426/523 |
| 2012/0017771 A1 * | 1/2012 | Li | A47J 37/0722 | 99/332 |
| 2015/0107463 A1 * | 4/2015 | Lehman | A47J 39/006 | 99/443 C |
| 2015/0107464 A1 * | 4/2015 | Lehman | A47J 37/0611 | 99/444 |
| 2016/0183721 A1 * | 6/2016 | Fakhuri | A47J 37/0718 | 426/523 |
| 2016/0360923 A1 * | 12/2016 | Buzick | A47J 37/0611 | |
| 2017/0035246 A1 * | 2/2017 | Roostaie | A47J 37/0885 | |
| 2017/0231423 A1 * | 8/2017 | Reales Bertomeo | A47J 37/06 | 99/339 |
| 2017/0303742 A1 * | 10/2017 | Gallego II, II | A47J 37/0857 | |

* cited by examiner

FOOD PRODUCT ADAPTER FOR VERTICAL GRILL

CROSS-REFERENCE TO RELATED APPLICATIONS

This application claims the benefit of priority to U.S. Provisional Patent Application No. 62/515,912, filed on Jun. 6, 2017, which is hereby incorporated by reference in its entirety.

TECHNICAL FIELD

This disclosure relates to food product adapters for vertical cooking grills.

BACKGROUND

Vertical cooking grills provide a compact arrangement for efficient, high-volume cooking of food. During the cooking process, food is loaded from the top of the vertical grill. The food is retained in a cooking position until heated to a desired temperature. The food is then released from a cooking position to drop onto a food receiving location for removal from the vertical cooking grill.

SUMMARY

This disclosure provides a vertical cooker comprising a plurality of vertically oriented cooking slots, a fixed platen, a movable platen, a first opening, and a first food product adapter. The fixed platen is positioned on a first side of each one of the vertically oriented cooking slots. The movable platen is positioned on a second, opposite side of each one of the vertically oriented cooking slots from the fixed platen. The first opening is positioned at a top end of each one of the plurality of vertically oriented cooking slots. The first opening is sized and dimensioned to accept a food product. The first food product adapter is inserted through a respective first opening to be positioned within a one of the plurality of vertically oriented cooking slots. In addition, the first food product adapter includes a plurality of slots or grooves oriented vertically when the first food product adapter is positioned in the one of the plurality of vertically oriented cooking slots.

Advantages and features of the embodiments of this disclosure will become more apparent from the following detailed description of exemplary embodiments when viewed in conjunction with the accompanying drawings.

DETAILED DESCRIPTION

Figure 1:
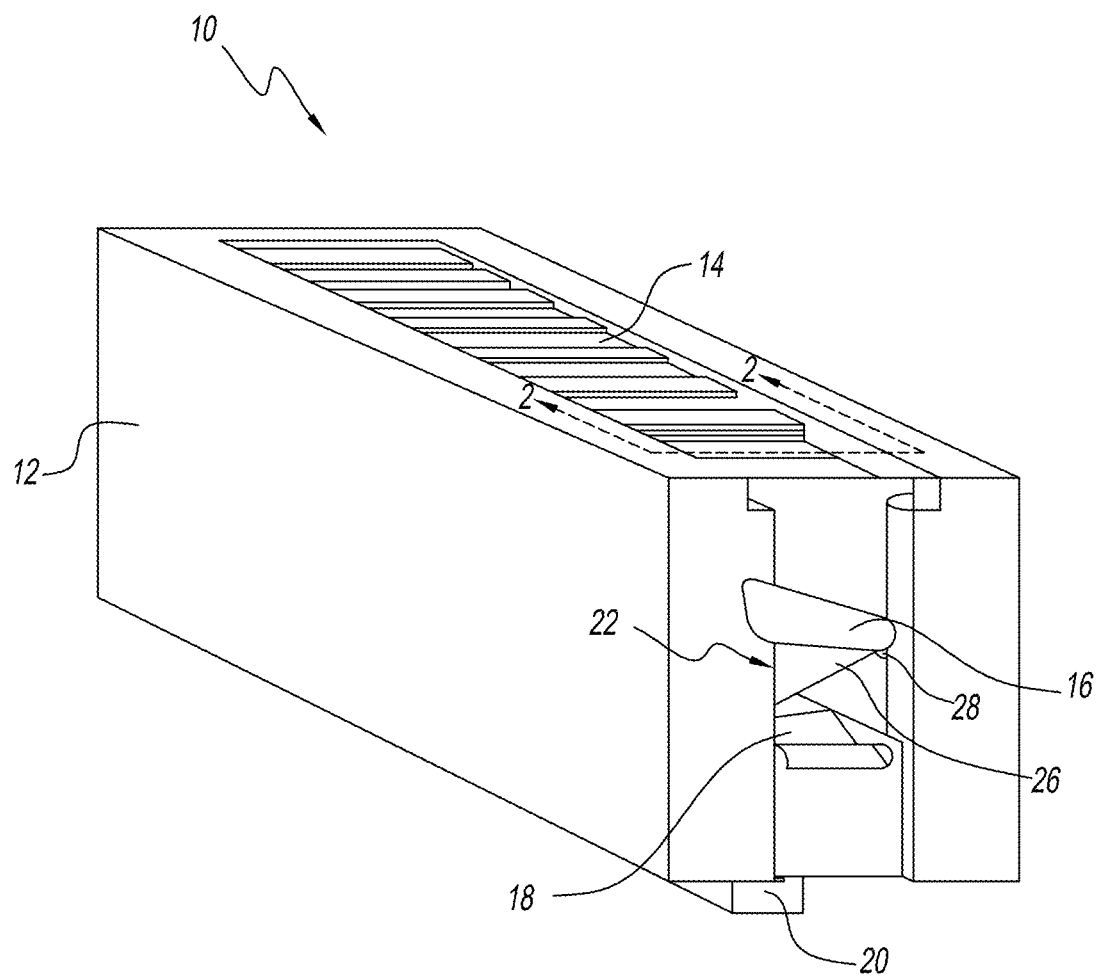
FIG. 1 shows a perspective view of a vertical grill incorporating a cooking sleeve in accordance with an exemplary embodiment of the present disclosure.

Referring to FIG. 1 a vertical cooking grill is shown and generally indicated at 10. Vertical cooking grill 10 is typically used in environments requiring high volumes of cooked food or food product, such as in cafeterias, fast food restaurants, and the like. While vertical cooking grills provide many advantages in fast, efficient cooking of food product, one challenge with vertical grills is that such grills are optimized to heat or cook patties of a particular size and configuration, such as a round, square, or rectangular patty approximately the size of a hamburger, such as, for example, a four and a half-inch diameter round or four and a half-inch per side square patty. Thus, in a situation where, for example, the food to be cooked are hotdogs, chicken fingers, sausages, fish sticks, and the like, a vertical cooker optimized for a standard or average hamburger or chicken patty may be unsuitable for elongated food or irregularly shaped food. Accordingly, the present disclosure provides an easily installed and removed food product adapter sized and dimensioned for installation into a vertical cooker or grill. The food product adapter enables heating or cooking of other shapes in a standard hamburger slot, such as sticks, tubes, rolls, and other food product having a relatively narrow width and a relatively long length, such as a hot dog, fish stick, or the like.

Figure 2:
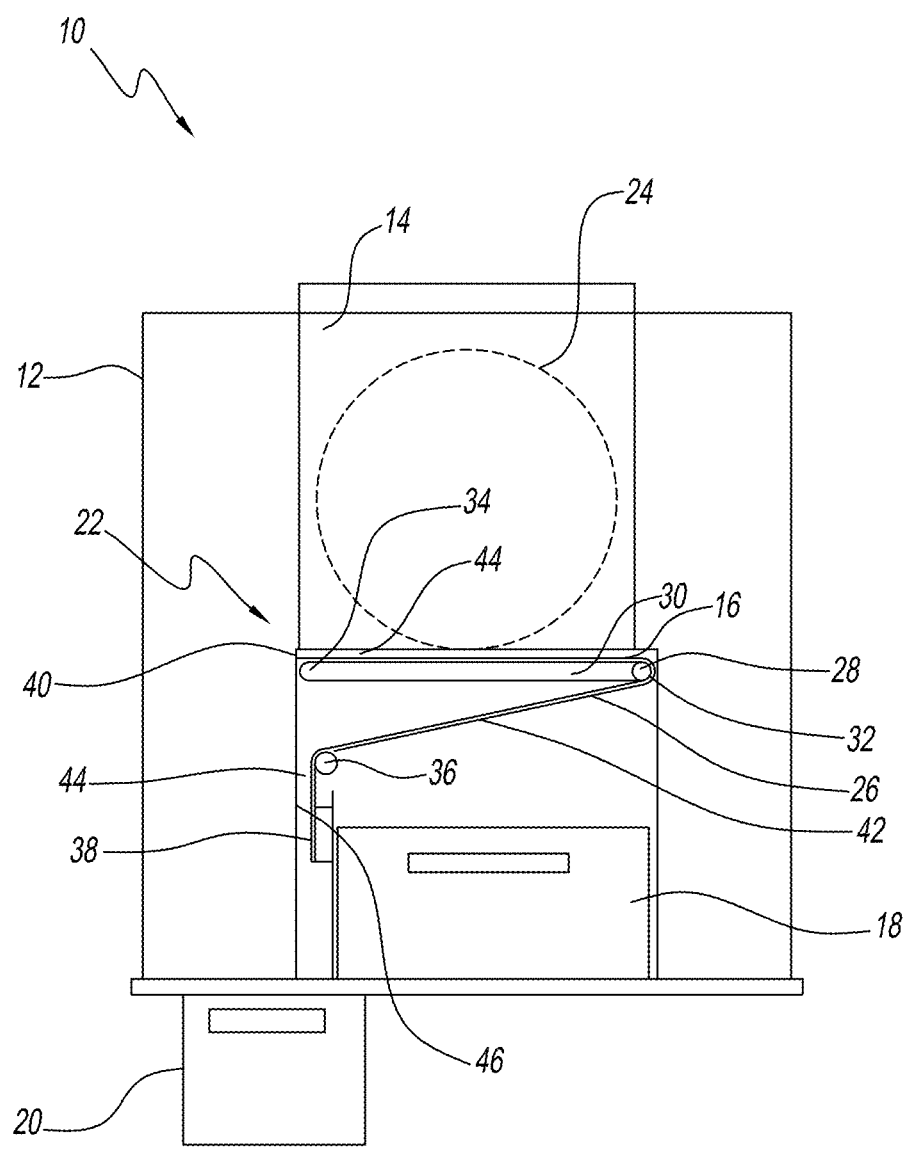
FIG. 2 shows a view of the vertical grill of FIG. 1 along the lines 2-2 with a food patty in a cooking position in accordance with an exemplary embodiment of the present disclosure.
Figure 3:
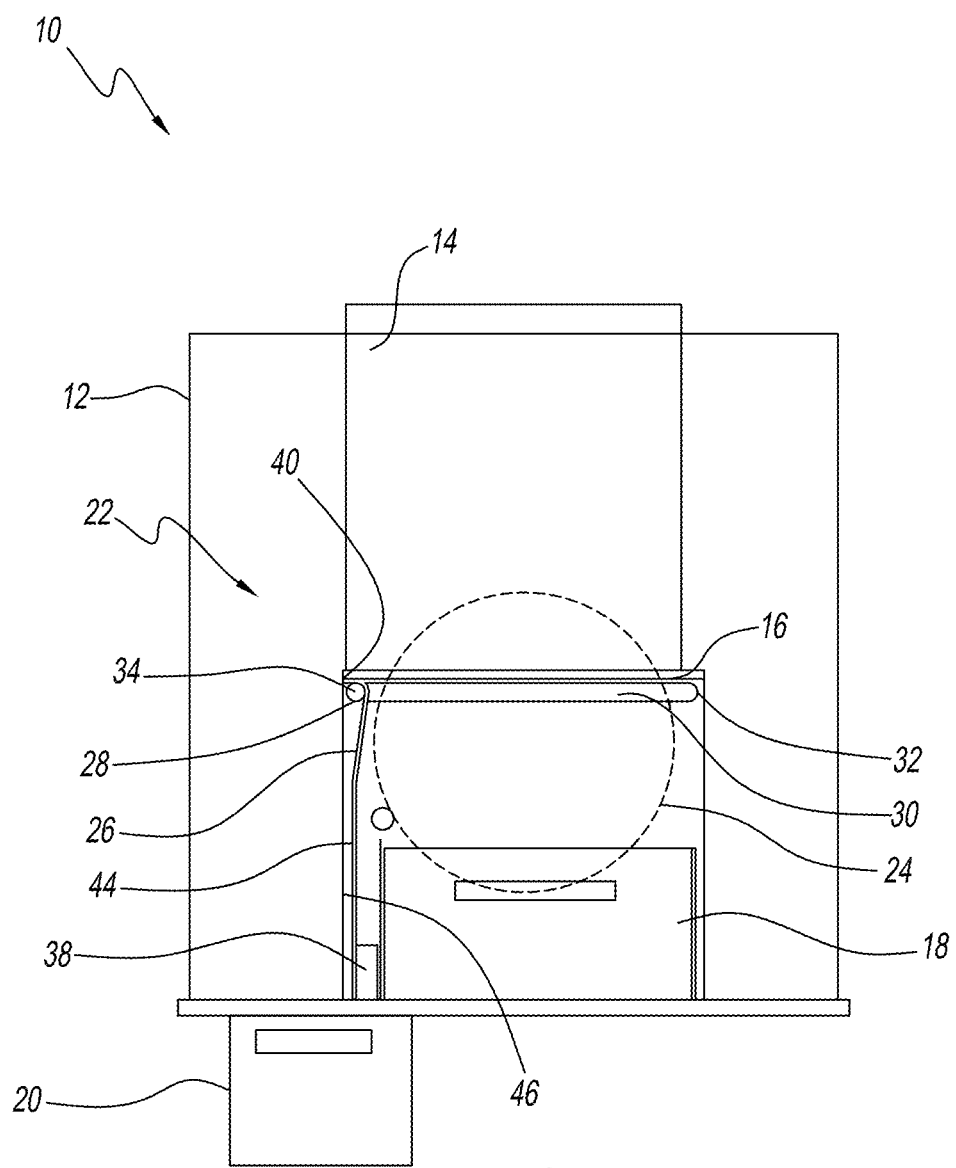
FIG. 3 shows a further view of the vertical grill of FIG. 2 with a grease curtain and movable door positioned to permit the food patty to move from the cooking position to a food receiving location.

Referring to FIGS. 1-3, vertical cooking grill 10 includes a housing 12 in which are positioned a plurality of cooking slots 14, a trap door 16, a food product delivery tray or finished product receiving area 18, a grease pan 20, and a movable door system 22. Vertical cooking grill 10 may be similar to the grill shown in U.S. Pat. No. 8,367,977, the entire content of which is incorporated herein by reference in its entirety. Cooking slots 14 are oriented in a vertical direction and are configured to hold a food product 24. Once food product 24 is cooked, trap door 16, which includes a plurality of openings, is moved from a closed position to an open position where the openings permit cooked food product to fall under the influence of gravity onto food product delivery tray 18.

In the exemplary embodiment, vertical cooking grill 10 includes movable door system 22, which includes a flexible door or movable curtain 26, a top or movable rod 28 over which flexible door 26 extends or is draped, a pair of tracks 30 in which movable rod 28 slides between a first position 32 and a second position 34, a fixed rod 36, and a weight or other tensioner 38. Flexible door 26 is fabricated from a sheet of flexible, food grade material. In an exemplary embodiment, the food grade material is a sheet of Teflon. The sheet of Teflon is fixedly attached to vertical cooking grill at an anchor location 40, and then routed over movable rod 28, and then around fixed rod 26. Tracks 30 are horizontally oriented and are attached to trap door 16 along a first or front side and along a second or back side in a location such that movable rod 28 presses the material of flexible door 26 against an underside of trap door 16 as movable rod 28 traverses from first position 32 to second position 34. The end of flexible door 26 that extends vertically below fixed rod 26 receives weight or other tensioner 38, which keeps flexible door 26 against movable rod 28 as movable rod 28 moves between first position 32 and second position 34 along track 30.

Movable rod 28 moves between first position 32 and second position 34 under the manual action of an operator, or by the power of an actuator (not shown). Movable rod 28 is shown in first position 32 in FIG. 2. As food product 24 cooks, oil, grease, and other debris from the cooking process falls vertically onto trap door 16 and onto flexible door 26 when such debris falls through openings in trap door 16. Liquid debris such as oil and/or grease flow onto flexible door 26. Once the cooking process is complete, an actuator changes the position of movable rod 28 from first position 32 to second position 34. As movable rod 28 traverses the underside of trap door 16, movable rod 28 wipes oil and/or grease from the underside of trap door 16, causing the oil and/or grease and other debris to flow along an upper angled surface 42 of flexible door 26 or through gaps in flexible door 26 adjacent to where flexible door 26 attaches to vertical cooking grill 10. Debris from the cook process flows along a debris channel 44 located between a vertical portion of flexible door 26 that is vertically below fixed rod 36 and an interior or inner wall 46 of housing 12. The debris continues to flow vertically into grease pan 20, which is removed periodically for disposal of the debris and cleaning of grease pan 20.

As movable rod 28 traverses from first position 32 to second position 34, weight or tensioner 38 keeps flexible door 26 under tension, which enables flexible door 26 to maintain contact with movable rod 28 as movable rod 28 traverses from first position 32 to second position 34, which thus moves flexible door 26, which is positioned vertically along a longitudinal line between cooking slots 14 and food product delivery tray 18 while food product 25 is cooking, into a position where flexible door 26 is no longer positioned longitudinally between cooking slots 14 and flexible door 26, as shown in FIG. 3. Once movable rod 28 is in second position 34, trap door 16 is actuated to move slots in trap door 16 such that the slots are aligned with cooking slots 14, which permits cooked food product 24 to fall vertically onto food product delivery tray 18. Once food product has dropped vertically from cooking slots 14 into food product delivery tray 18, trap door 16 is closed, and movable rod 28 is restored to second position 34 from first position 32, and the cooking process is repeated with additional food product 24 delivered to cooking slots 14.

Trap door 16 and movable door system 22 are easily removable from vertical cooking grill 10 to permit cleaning of trap door 16 and the components of movable door system 22.

Figure 6:
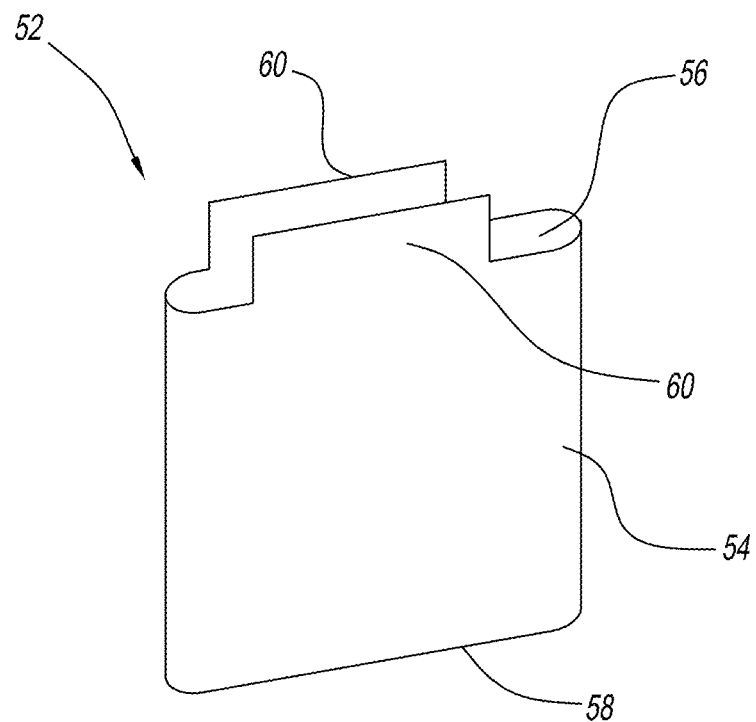
FIG. 6 shows a perspective view of a cooking sleeve in accordance with an exemplary embodiment of the present disclosure.
Figure 7:
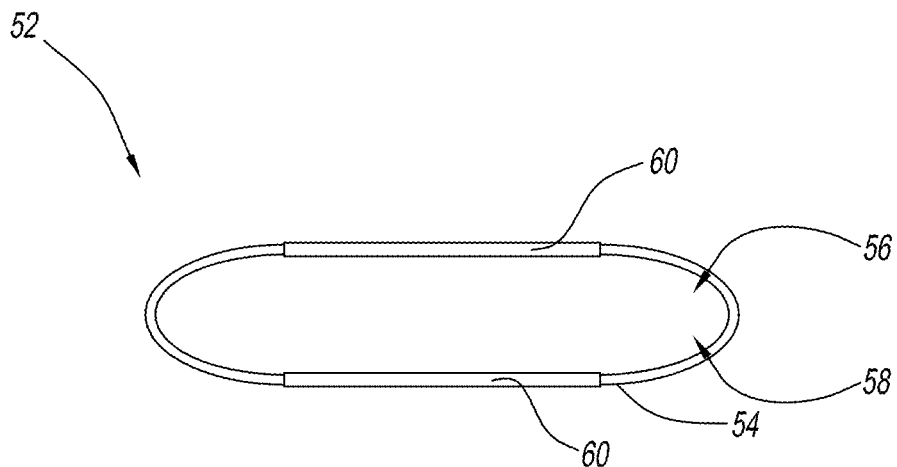
FIG. 7 shows a top view of the cooking sleeve of FIG. 6 with the cooking sleeve in an uncompressed configuration.
Figure 8:
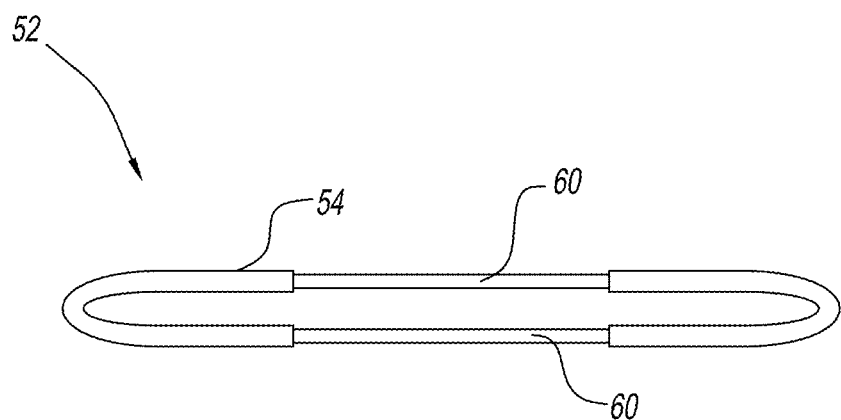
FIG. 8 shows a top view of the cooking sleeve of FIG. 6 with the cooking sleeve in a compressed configuration.
Figure 9:
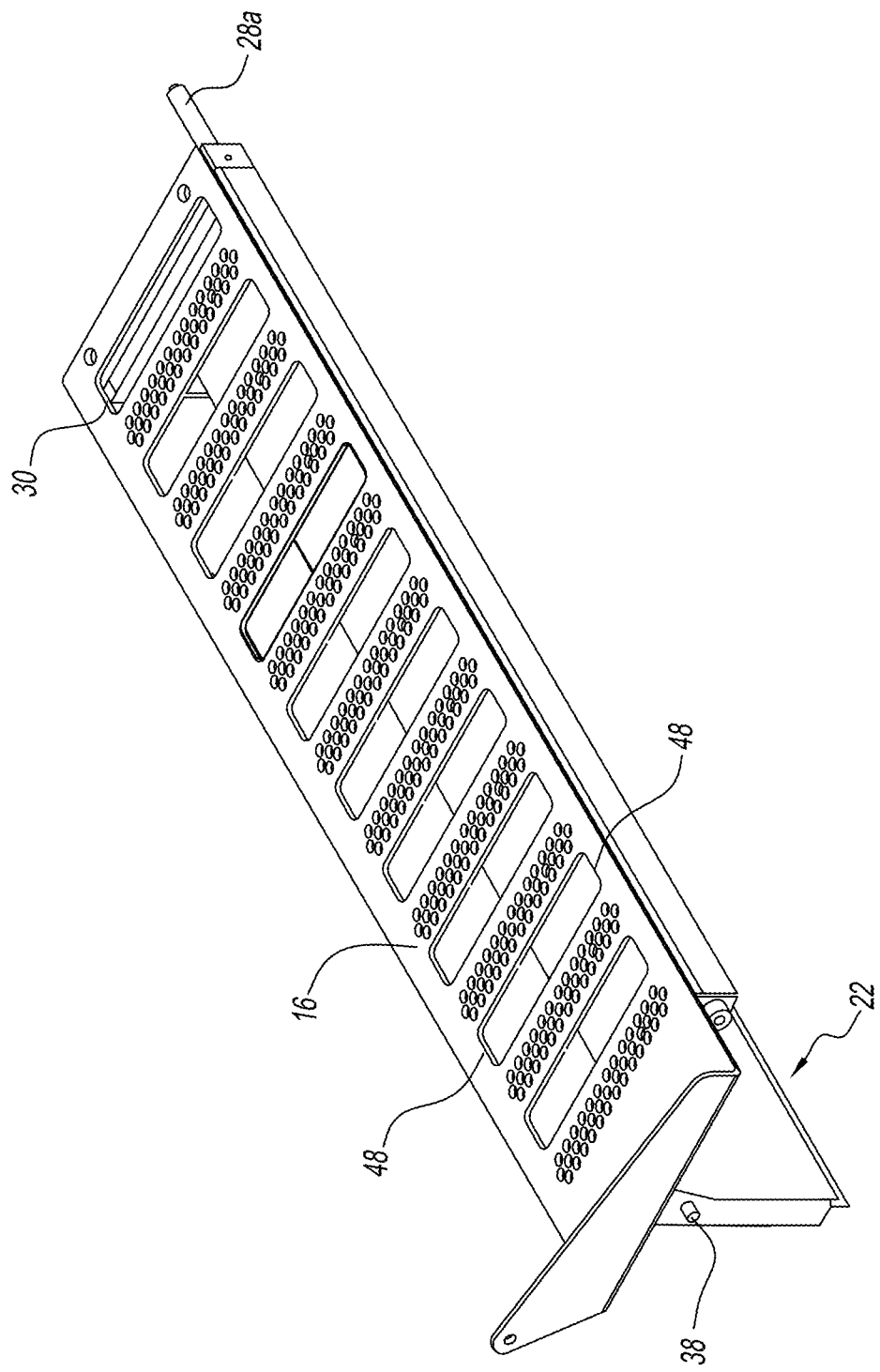
FIG. 9 shows a perspective view of a movable door system of the vertical grill of FIG. 1.

Vertical cooking grill 10 further includes a cooking sleeve, cooking pouch, or cooking liner 52. As shown in FIGS. 6-8, sleeve 52 is a flattened cylinder. In other words, a body 54 of cooking liner 52 is shaped as a tube, with a first or upper opening 56 and a second or lower opening 58. Extending from a first or top end of body 54 are two extensions or protrusions 60.

Vertical cooking grill 10 includes an attachment device or mechanism 62. In the exemplary embodiment of FIGS. 4 and 5, attachment device 62 includes a clamp arm 64, a pivot or hinge 66, and a gripping or securing end 68. Pivot or hinge 66 includes a torsional spring (not shown) that causes gripping or securing end 68 to be biased into contact with a portion of housing 12.

Vertical cooking grill 10 further includes a slot, gap, or opening 70 formed into an interior portion of each cooking slot 14. Opening 70 provides access to a chamber 72.

Cooking sleeve 52 is slid into position in a cooking slot 14 from a top or upper end of cooking slot 14. One extension 60 is routed, pushed into, or extended into and through opening 70 into chamber 72. The other, opposite extension 60 is positioned between housing 12 and gripping end 68, which is accomplished by lifting clamp arm 64, positioning extension 60 between housing 12 and gripping end 68, and releasing clamp arm 64. Cooking sleeve 52 is now secured within cooking slot 14 of vertical cooking grill 10.

Figure 4:
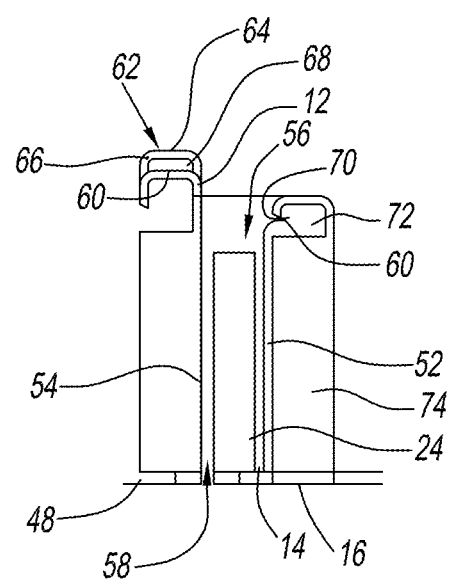
FIG. 4 shows a view of the vertical grill of FIG. 1 along the lines 4-4 with a food patty in a cooking position.

During operation, and as shown in FIG. 4, food product 24 is inserted into first or upper opening 56. The position of extensions 60 are such that food product 24 is guided into body 54 of cooking sleeve 52 without catching on any edges. As described hereinabove, food product 24 is maintained within cooking slot 24 by movable trap door 16.

To cook food product 24, a movable platen 74 is moved toward food product 24. As platen 74 is moved toward food product 24, cooking sleeve 52 is compressed or deformed from the approximate shape shown in FIG. 7 to the approximate shape shown in FIG. 8. As cooking sleeve 52 is compressed, extension 60 that extends through opening 70 extends further through opening 70 into chamber 72, as shown in FIGS. 4 and 5.

Figure 5:
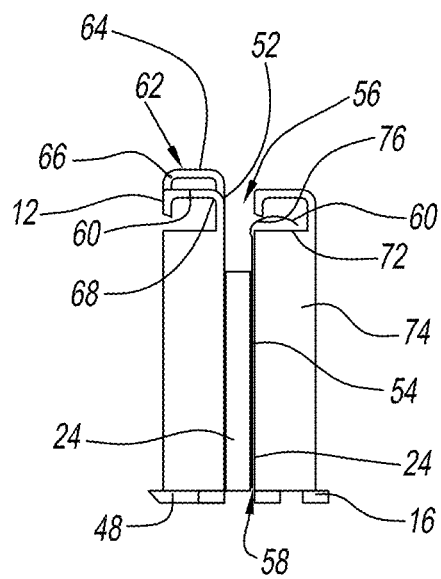
FIG. 5 shows a further view of the vertical grill of FIG. 4 with a platen of the vertical grill closed for cooking of the food patty.

The platen positioned to cook food product 24 is shown in FIG. 5. Steam passages (not shown) formed in housing 12 then cooking food product by transferring heat through cooking sleeve 52 into food product 24. Once cooking is complete, platen 74 is moved away from food product 24, and door 16 is moved laterally or transversely to the direction of cooking slot 14 such that opening 48 in door 16 is aligned with cooking slot 14, and food product 24 drops under the force of gravity through second or lower opening 58 into or onto food product delivery tray 18. As platen 74 moves from the position shown in FIG. 5 to the position shown in FIG. 4, compression of cooking sleeve 52 is released, and the thickness of cooking sleeve 52 provides a restoring or spring force to cooking sleeve 52 that causes cooking sleeve 52 to move from the shape shown in FIG. 8 to the shape shown in FIG. 7. At the same time, extension 60 that extends through opening 70 is retracted through opening 70 away from chamber 72, moving from the position shown in FIG. 5 to the position shown in FIG. 4.

As described hereinabove, cooking sleeve 52 is formed of a food grade material. It should be apparent that the food grade material can have a degree of spring to provide a restoring force to enable cooking sleeve 52 to move from a compressed to an uncompressed configuration. One exemplary material for cooking sleeve 52 can be polytetrafluoroethylene (PTFE), which is known by the trade name Teflon. Another exemplary material is silicone. Other non-stick or low-friction materials can be used.

Approximate exemplary dimensions for cooking sleeve 52 can include a height of 6 inches, extension width of 4 inches, extension height of 1.38 inches, a sleeve circumference in the range 12.25 to 12.37 inches, open dimensions of 5.63 inches by 0.95 inches, and closed or compressed dimensions of 6 inches by 0.2 inches. An exemplary thickness of cooking sleeve 52 is 0.004 inches. However, it should be understood from the present disclosure that the thickness of cooking sleeve 52 can be less or more than 0.004, as long as cooking sleeve 52 is sufficiently durable for a plurality of cooking cycles and as long as cooking sleeve 52 will have sufficient restoring force to return to an uncompressed state when platen 74 is moved away from food product 24.

While cooking sleeve 52 is shown secured to vertical cooking grill 10 by a clamp device or mechanism, it should be understood that other devices or mechanisms can be used to secure cooking sleeve 52 to grill 10. For example, openings formed in extensions 60 can be secured to pins. Such openings can include an interference fit with the mating pins to aid in securing cooking sleeve 52 to grill 10, or a clamp may be positioned to prevent cooking sleeve 52 from sliding off from the pins. Fasteners can also be used to secure sleeve 52 to grill 10, as well as hook and loop fasteners, adhesives, and the like compatible with the food, grease, and temperature environment of vertical cooking grill 10. One feature of such attachment is ease of removal of cooking sleeve 52. The ability to remove cooking sleeve 52 enables ease of cleaning of sleeve 52 and ease of replacement as sleeve 52 wears.

It should be apparent that sleeve 52 can be partially cleaned during use by way of a swab or squeegee sized and dimensioned to fit into cooking slot 14 when cooking slot 14 is open. The squeegee can be inserted several times into each cooking sleeve 52, pushing residue toward second or lower opening 58, decreasing buildup during operation that can lead to an undesirable appearance of food product 24.

As noted hereinabove, one potential challenge with vertical cooking grill 10 is that grill 10 may be configured to hold a specific size and configuration of food. Applicant recognized that the utility of vertical cooking grill 10 might be increased if vertical cooking grill 10 could adapt to food products smaller than the cooking slots 14, particularly elongated or high aspect ratio food such as hot dogs, chicken fingers, fish sticks, cheese sticks, and the like, and other irregularly shaped food suitable for cooking in a vertical grill, such as jalapeno poppers, pot stickers, chicken nuggets, chicken strips, and the like. In terms of aspect ratio, the food product adapter can, in an exemplary embodiment, position food product 24 for cooking with a length to width aspect ratio of 2:1 or greater. It should be understood that such food is likely to be frozen prior to insertion into vertical cooking grill 10.

Figure 10:
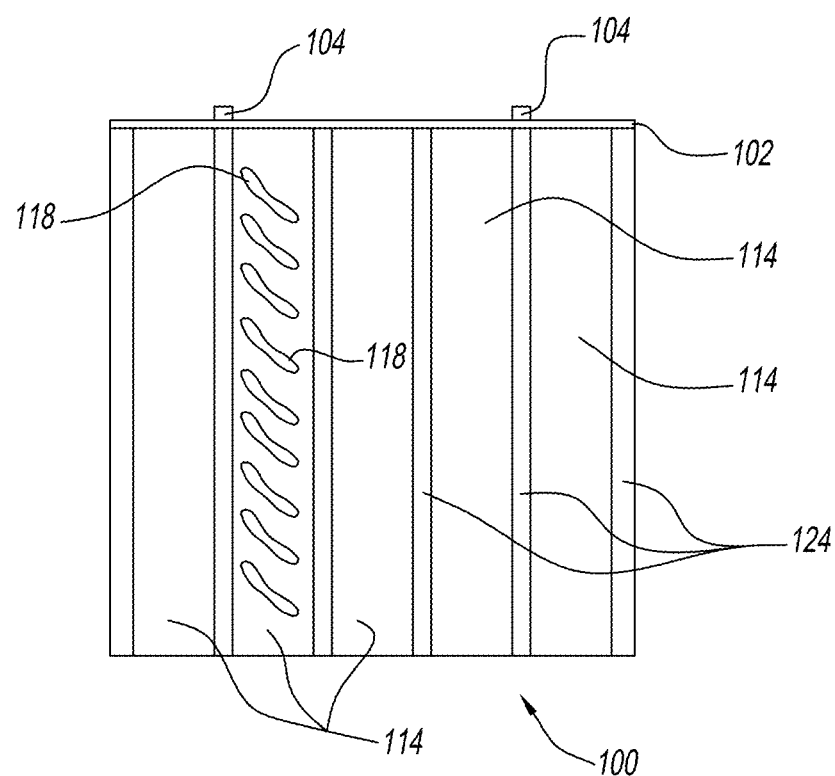
FIG. 10 shows a front view of a food product adapter in accordance with an exemplary embodiment of the present disclosure.
Figure 11:
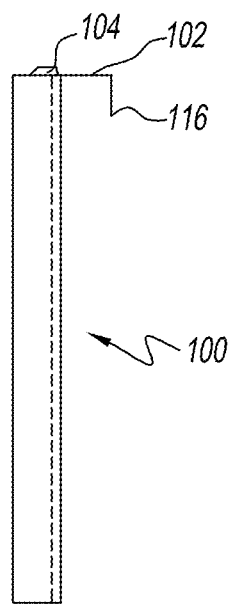
FIG. 11 shows a side view of the food product adapter of FIG. 10.
Figure 12:
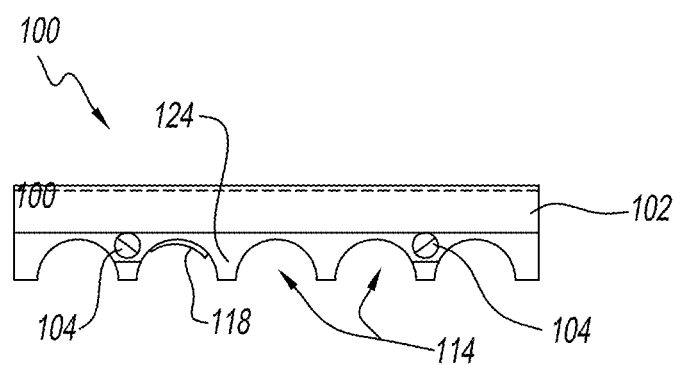
FIG. 12 shows a top view of the food product adapter of FIG. 10.

FIGS. 10-20 disclose food product adapters, holders, inserts, or brackets in accordance with exemplary embodiments of the present disclosure that can be attached to, for example, vertical cooker 10 of FIG. 1. A first embodiment food product adapter 100 is shown in FIGS. 10-12. Adapter 100 includes a mounting bracket 102 for supporting food product adapter 100 at a top 106 of a fixed platen 108 or movable platen 110 of a vertical cooker 112. Mounting bracket 102 is attached to food product adapter 100 by way of one or more fasteners 104, which can include welding, brazing, separate fasteners, gluing, adhering, mechanical engagement, and other fastening devices and configurations. Mounting bracket 102 can include a lip 116 helps secure mounting bracket 102 to fixed platen 108 or movable platen 110.

In an exemplary embodiment, food product adapter 100 is formed of a relatively rigid conductive food-grade material. For example, food product adapter 100 can be formed of a stainless steel, cast iron, or other materials suitable for exposure to temperatures generated by vertical cooker 10. Other thermally conductive non-metallic materials can also be used, including thermally conductive ceramic.

Food product adapter 100 is configured to be easily installed and removed from vertical grill or cooker 112. More specifically, food product adapter 100 is sized and dimensioned to slide into cooking slot 14. However, since cooking slot 14 is configured with opening 128 at a top end, through which food product adapter 100 is inserted into cooking slot 14, and opening 58 at a bottom end (see FIGS. 4 and 5), food product adapter 100 could drop entirely through cooking slot 14. Accordingly, mounting bracket 102 rests on top 106 of fixed platen 108 or movable platen 110 to prevent food product adapter 100 from dropping through cooking slot 14, and lip 116 of mounting bracket 102 contacts a side of fixed platen 108 or movable platen 110 that is opposite to a side of fixed platen 108 or movable platen 110 from cooking slot 14, which then secures food product adapter 100 against a respective fixed platen 108 or movable platen 110. In an exemplary embodiment, fastener 104 extends through an opening (not shown) in mounting bracket 102, and the opening can be in a form of a slot to permit adjusting a relative position of food product adapter 100 with respect to the respective platen on which food product adapter 100 is secured.

Since food product adapter 100 is secured in cooking slot 14 by gravity through the interaction of mounting bracket 102 with an adjacent platen, food product adapter 100 is easily removed without the use of any tools. Thus, when food product adapter 100 needs to be cleaned, either mounting bracket 102 or food product adapter 100 can be grasped and lifted upwardly from an associated cooking slot 14 without the use of any tools.

Food product adapter 100 includes a plurality of longitudinally extending slots or grooves 114 that are sized and dimensioned for a type of food being heated or cooked, such as hot dogs, egg rolls, bratwurst, kielbasa or polish sausage, fish sticks, chicken sticks, potato sticks, and other products having a relatively narrow width and thickness as compared to length. However, it should be noted that a food product adapter can be sized and dimensioned to receive "bite" sized foods, such as chicken nuggets, fish nuggets, potato wedges, and other smaller food. In an exemplary embodiment, longitudinally extending slots or grooves 114 are configured to have a curvilinear shape when viewed from a direction that is a direction in which slots or grooves 114 extend. The curvilinear shape can be, for example, an arc segment of a circle having a radius.

Figure 13:
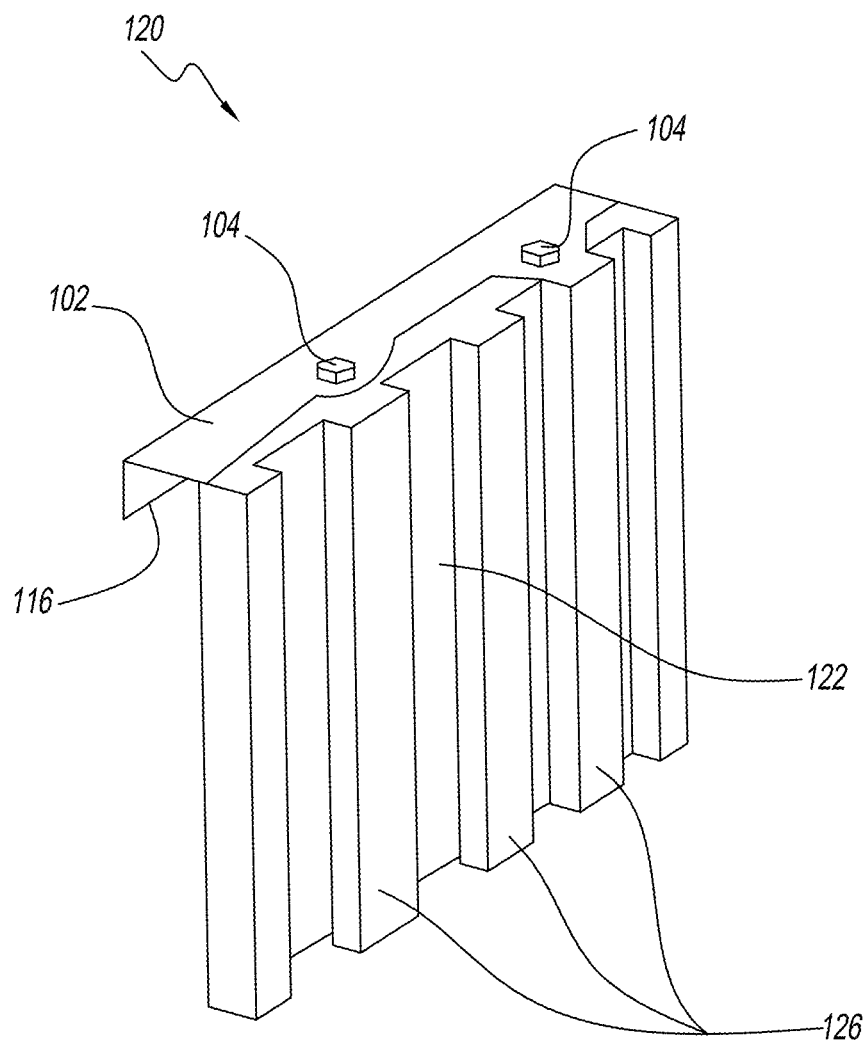
FIG. 13 shows a perspective view of another food product adapter in accordance with an exemplary embodiment of the present disclosure.

FIG. 13 shows another food product adapter 120 in accordance with an exemplary embodiment of the present disclosure. Food product adapter 120 includes one or more square or rectangular channels, grooves, or slots 122, as opposed to the arcuate or curvilinear slots 114 of FIGS. 10-12.

Each of food product adapter 100 and 120 includes one or more protrusions 124 or protrusions 126 that separate slots or grooves 114 or square or rectangular channels, grooves, or slots 122, respectively. It should be apparent that slots 114 and slots 122 are sized to hold food product 24 within a predetermined size and shape range, separated by protrusions 124 and 126. For example, slots 114 can be sized and dimensioned to hold food product 24 in the form of kielbasa. Protrusions 124 help position adjacent food product 24 away from each other in a generally vertical orientation. Positioning food product 24 away from each other helps prevent food product 24 from contacting adjacent food product 24, which can affect cooking time and cause damage to food product 24. It should also be apparent that slots or grooves 114 or 122 are oriented to be parallel to each other in an exemplary embodiment, as protrusions 124 or 126 may be.

Protrusions 124 and 126 are sized and dimensioned to permit compression of food product 24. In other words, when food product adapter 100 or food product 120 is positioned on fixed platen 108 in respective cooking slot 14, protrusions 124, for example, are spaced away (a spaced distance) from an adjacent movable platen 110 on an opposite side of the respective cooking slot 14 from fixed platen 108. Thus, when food product 24 is positioned to be in contact with slots or grooves formed in food product adapter 100 or food product adapter 120, food product 24 extends beyond protrusions 124 or 126, respectively, in a direction that is toward adjacent movable platen 100.

Food product adapters 100 and 120 can include raised areas 118 to imprint onto food product. For example, raised areas 118 can simulate grill marks, or imprint a logo onto food product. Raised areas 118 of FIGS. 10 and 12 simulate grill marks on heated or cooked food. Such simulated grill marks can simulate the grill marks left by wires, grids, or grills of a charcoal, wood, or gas grill.

Figure 14:
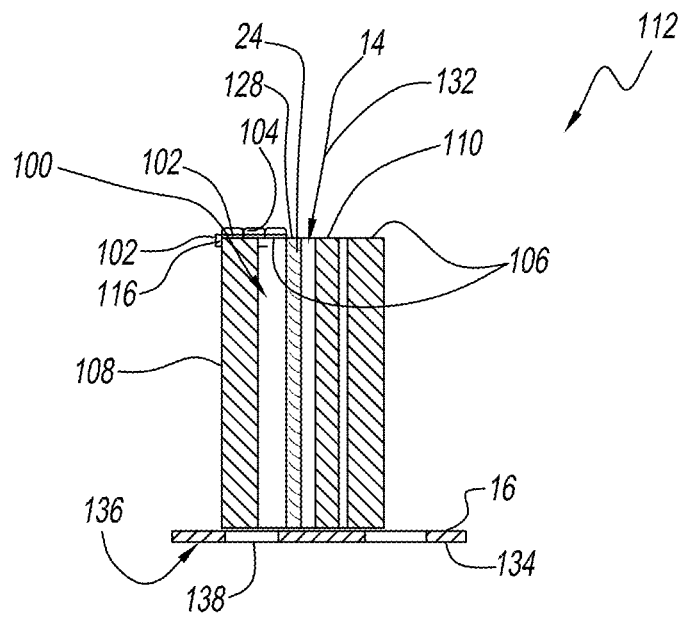
FIG. 14 shows a view of a portion of a vertical cooker with a single food product adapter in accordance with an exemplary embodiment of the present disclosure, with a movable platen in an open position.
Figure 15:
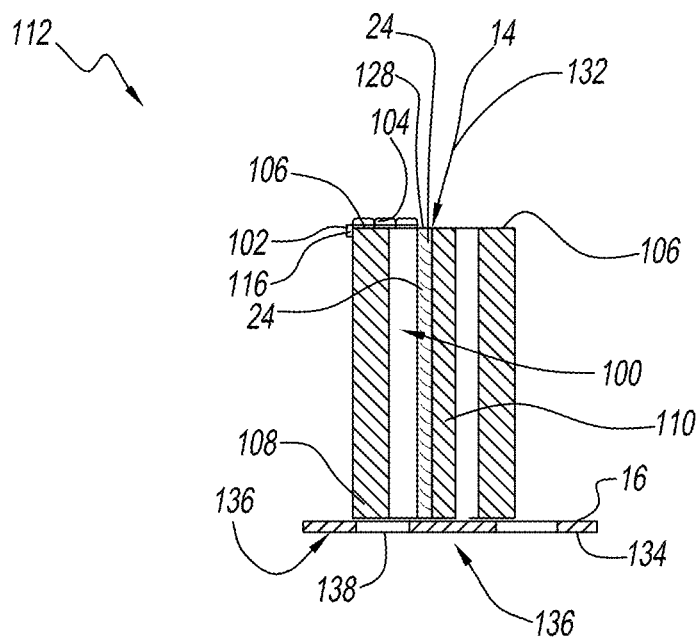
FIG. 15 shows another view of the vertical cooker of FIG. 14, with the movable platen in a closed position to compress a food product.
Figure 16:
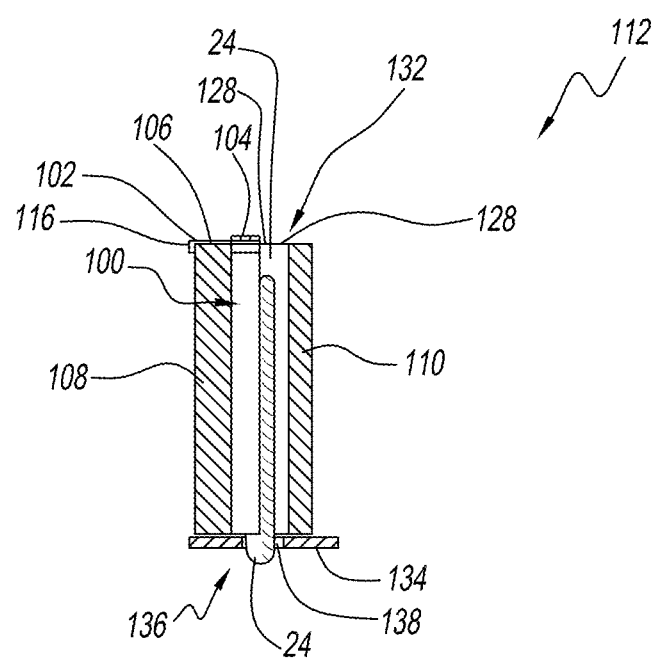
FIG. 16 shows a further view of the vertical cooker of FIG. 14, with the movable platen in an open position, and a lower or bottom movable door positioned to permit the cooked or heated food product to drop vertically from the vertical cooker.

FIGS. 14-16 show vertical grill 112 with mounted food product adapter or holder 100 in three positions.

In FIG. 14, food product 24 has been loaded into food product adapter 100 by way of load openings 128 at or adjacent to a top 132 of the vertical grill or cooker. A movable trap door 134 at a bottom 136 of vertical cooker 112 is positioned such that trap door 134 retains food product 24 in a cooking position between fixed platen 108 and movable platen 110.

In FIG. 15, movable platen 110 has been moved to clamp and compress food product 24. When movable platen 110 compresses food product 24, heating and cooking of food product 24 takes place, and the heating and cooking process takes place. Compression of food in an exemplary embodiment can be in a range of, for example, 5% to 50%, depending on the type of food product 24. In another exemplary embodiment, compression of food product 24 can be in a range of 10% to 40%. In a further exemplary embodiment, compression of food product 24 can be in a range of 15% to 35%. In yet another embodiment, compression of food product can be in a range of 15% to 25%. Generally, softer or more compressible food product 24, such as hot dogs, can be compressed a greater amount than foods that are generally harder, such as solid chicken patties. It should be understood that compressible can be variable with time because food product 24 begins frozen, and compresses as it heats and thaws.

In the exemplary embodiments of the present disclosure, vertical cooker or vertical cooking grills 10 and 112 can be a closed loop vertical steam cooker that heats and cooks food product 24 with superheated, high pressure steam. Thus, cooking is accomplished at a rapid rate.

In FIG. 16, movable platen 100 has retracted or moved in a direction that is away from fixed platen 108, which unclamps or release food product 24 from frictional contact with fixed platen 108. Then movable trap door 134 is positioned such that a food product opening, passage, exit, or drop 138 is aligned with food product 24, and food product 24 falls under the force of gravity to exit vertical cooker or grill 112.

Figure 17:
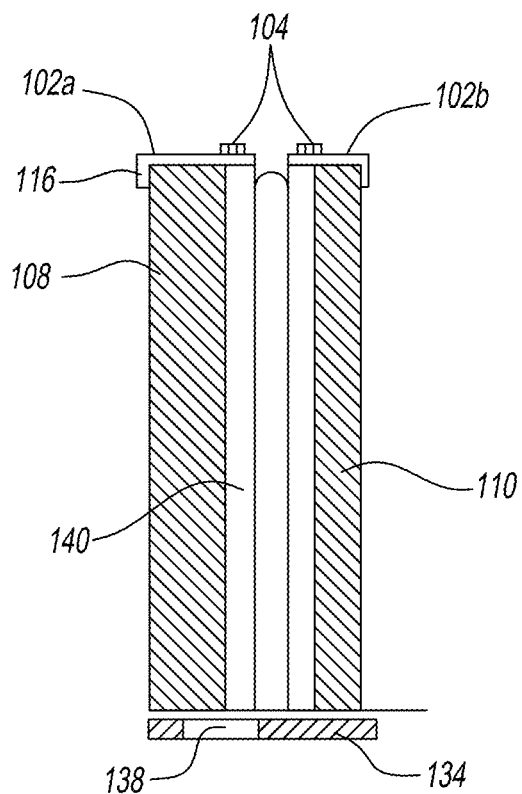
FIG. 17 shows a view of a portion of a vertical cooker with a pair of food product adapters in accordance with an exemplary embodiment of the present disclosure, with a movable platen in an open position.
Figure 18:
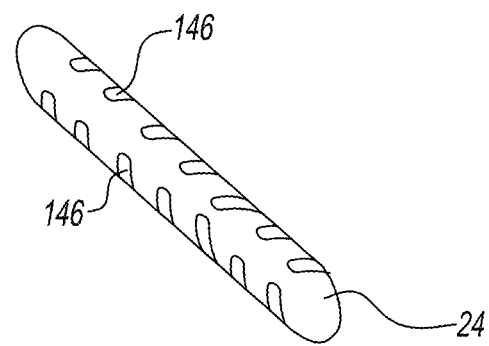
FIG. 18 shows a perspective view of food product that was heated or cooked in the vertical cooker of FIG. 17.

FIG. 17 shows another food adapter configuration in accordance with an exemplary embodiment of the present disclosure. In the embodiment of FIG. 17, a food product holder or adapter 140 is attached to fixed platen 108 by way of a mounting bracket 102*a* and a food product holder or adapter 142 is attached to movable platen 110 by way of a mounting bracket 102*b*. Each food product holder or adapter 140 and 142 includes raised areas 144 to provide an imprint 146 on food product 24, such as the grill marks shown in FIG. 18.

Figure 19:
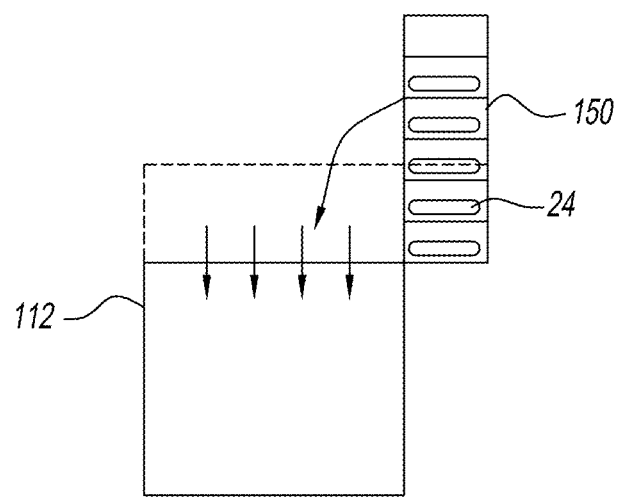
FIG. 19 shows a view of a vertical grill with an autoloader in accordance with an exemplary embodiment of the present disclosure.
Figure 20:
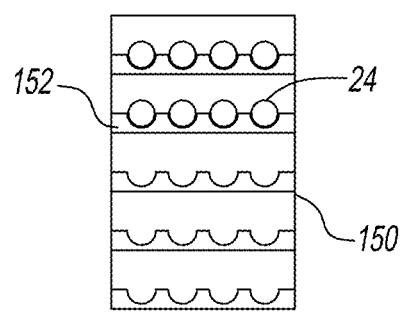
FIG. 20 shows a view of the autoloader of FIG. 19.

FIGS. 19 and 20 show views of a portion of an automatic loader 150 that includes a loader adapter 152 to properly position food product 24 for loading into food product adapters or holders 100 or 120 shown in FIGS. 10-13 when mounted or positioned on vertical grill or cooker 112. Loader adapter 150 maintains transverse spacing of food product to match transverse spacing or grooves, slots, or channels 122 in food product adapters or holders 100 or 120.

While various embodiments of the disclosure have been shown and described, it is understood that these embodiments are not limited thereto. The embodiments may be changed, modified, and further applied by those skilled in the art. Therefore, these embodiments are not limited to the detail shown and described previously, but also include all such changes and modifications.

We claim:

1. A vertical cooker, comprising:
   a vertically oriented cooking slot, wherein the vertically oriented slot has a top opening at a top end thereof and a bottom opening at a bottom end thereof;
   a fixed platen positioned on a first side of the vertically oriented cooking slot;
   a movable platen positioned on a second, opposite side of the vertically oriented cooking slot from the fixed platen;
   a first food product adapter removably inserted into the opening, so that it is within the vertically oriented cooking slot, wherein the first food product adapter comprises a surface having a plurality of grooves that are oriented vertically when the first food product adapter is in the vertically oriented cooking slot; and
   a movable door below the bottom opening of the vertically oriented cooking slot, wherein the movable door has a door opening therein,
   wherein the movable platen is positionable in a first position to clamp the food product to the first food product adapter and to compress the food product and the movable platen is positionable in a second position to unclamp the food product from the first food product adapter, and the movable door moves together with the movable platen, so that when the movable platen moves to the second position, the door opening is aligned with the bottom opening, so that the food product passes therethrough.

2. The vertical cooker of claim 1, wherein the first food product adapter includes a mounting bracket connected to the surface, and the mounting bracket is secured to one of the fixed platen and the movable platen when the first food product adapter is in the vertically oriented slot.

3. The vertical cooker of claim 1, wherein the vertically oriented cooking slot has a curvilinear shape when viewed in a direction that is a direction in which the vertically oriented cooking slot extends.

4. The vertical cooker of claim 1, wherein the vertically oriented cooking slot has a square or rectangular shape when viewed in a direction that is a direction in which the vertically oriented cooking slot extends.

5. The vertical cooker of claim 1, wherein raised areas are positioned in the grooves, and the raised areas configured to transfer a mark to the food product.

6. The vertical cooker of claim 1, wherein the first food product adapter includes a plurality of protrusions that extend in the same direction that the plurality of grooves extend, wherein at least one of the plurality of protrusions is between adjacent grooves, and wherein the plurality of protrusions are sized and dimensioned such that when the first food product adapter is in the vertically oriented cooking slot adjacent to one of the fixed platen and the movable platen, the protrusions are a spaced distance to the other of the fixed platen and the movable platen.

7. The vertical cooker of claim 1, further comprising a food product loader, the food product loader including at least one food product adapter sized and dimensioned to position the food product for direct transfer from the food product loader to the plurality of grooves of the food product adapter positioned in the one of the plurality of vertically oriented cooking slots.

8. The vertical cooker of claim 1, wherein the food product adapter is sized and dimensioned for supporting at least one of hot dogs, chicken fingers, fish sticks, cheese sticks, jalapeno poppers, pot stickers, chicken nuggets, chicken strips, egg rolls, bratwurst, kielbasa or polish sausage, chicken sticks, potato sticks, fish nuggets, and potato wedges.

9. The vertical cooker of claim 1, further comprising:
a second food product adapter inserted into the vertically oriented cooking slot,
wherein the second food product adapter comprises a second plurality of grooves oriented vertically when the second food product adapter is in the vertically oriented cooking slot.

10. The vertical cooker of claim 9, wherein the second food product adapter comprises a second mounting bracket, wherein the second mounting bracket is secured to one of the fixed platen and the movable platen when the second food product adapter is in the vertically oriented slot.

11. The vertical cooker of claim 9, wherein the second food product adapter is removably inserted in the vertically oriented cooking slot.

12. The vertical cooker of claim 9, wherein the first food product adapter is secured to the fixed platen, and the second food product adapter is secured to the movable platen.

* * * * *